United States Patent [19]
Uhr et al.

[11] Patent Number: 5,726,280
[45] Date of Patent: Mar. 10, 1998

[54] SULFONIC ACID GROUP-CONTAINING POLYASPARTIC ACID DERIVATIVES, USE THEREOF AND PREPARTION THEREOF

[75] Inventors: Hermann Uhr; Lutz Heuer, both of Krefeld; Torsten Groth, Odenthal; Winfried Joentgen, Cologne; Roland Kleinstück, Bergisch Gladbach, all of Germany

[73] Assignee: Bayer AG, Leverkusen, Germany

[21] Appl. No.: 628,929

[22] Filed: Apr. 8, 1996

Related U.S. Application Data

[63] Continuation-in-part of Ser. No. 336,489, Nov. 9, 1994, Pat. No. 5,506,335.

[30] Foreign Application Priority Data

Aug. 24, 1994 [DE] Germany ............... 4429976.1

[51] Int. Cl.[6] .................... C08G 69/00; C11D 3/08
[52] U.S. Cl. .................... 528/328; 528/363; 528/364; 525/418; 525/420; 525/539; 525/540; 252/174.23; 252/174.24; 252/175; 252/527; 252/546
[58] Field of Search .................... 528/328, 363, 528/364; 525/418, 420, 539, 540; 252/174.23, 174.24, 175, 527, 546

[56] References Cited

U.S. PATENT DOCUMENTS

| | | | |
|---|---|---|---|
| 3,928,196 | 12/1975 | Persinski et al. | 210/58 |
| 4,363,797 | 12/1982 | Jacquet et al. | 424/70 |
| 4,534,881 | 8/1985 | Sikes et al. | 252/180 |
| 4,839,461 | 6/1989 | Boehmke | 528/363 |
| 5,049,310 | 9/1991 | Johnson et al. | 252/389.52 |
| 5,116,513 | 5/1992 | Koskan et al. | 210/698 |
| 5,152,902 | 10/1992 | Koskan et al. | 210/698 |
| 5,175,285 | 12/1992 | Lehmann et al. | 544/141 |
| 5,328,631 | 7/1994 | Du Vosel et al. | 252/174.23 |
| 5,506,335 | 4/1996 | Uhr et al. | 528/322 |

FOREIGN PATENT DOCUMENTS

| | | |
|---|---|---|
| 42 21 875 | 1/1994 | Germany. |
| 1 404 814 | 9/1975 | United Kingdom. |
| WO 92/14753 | 9/1992 | WIPO. |
| WO 94/01486 | 1/1994 | WIPO. |

OTHER PUBLICATIONS

Orbit Abstract of DE 42 21 875 (Jan. 5, 1994).

*Primary Examiner*—P. Hampton-Hightower
*Attorney, Agent, or Firm*—Connolly and Hutz

[57] ABSTRACT

Sulfonic acid group-containing polyaspartic acid derivatives, some of which are novel, having repeating units of the structures I and II

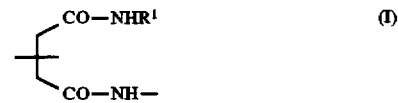

and if appropriate

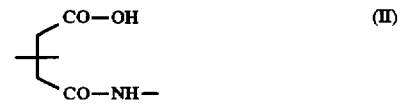

in which

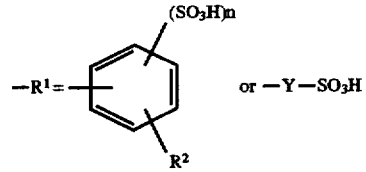

are suitable for water treatment and as a detergent additive.

15 Claims, No Drawings

SULFONIC ACID GROUP-CONTAINING POLYASPARTIC ACID DERIVATIVES, USE THEREOF AND PREPARTION THEREOF

CROSS-REFERENCE TO RELATED APPLICATION

The present application is a continuation-in-part application of U.S. patent application Ser. No. 08/336,489 filed on Nov. 9, 1994, now U.S. Pat. No. 5,506,335 which issued on Apr. 9, 1996.

BACKGROUND OF THE INVENTION

1. Field of the Invention

The invention relates to sulfonic acid group-containing polyaspartic acid derivatives, some of which are novel, preparation thereof and use thereof and synergistically active mixtures of polyaspartic acid and aminosulphonic acid and the use thereof.

2. Description of the Prior Art

In the utilization of natural waters for industrial purposes, e.g. as cooling waters, as process water or else in industrial cleaning processes, the water used is specifically or unintentionally altered physically and/or chemically. Thus, e.g., in open circulation cooling systems, temperature changes, concentration and pH elevation which is effected by the carbon dioxide discharge in the cooling tower are unavoidable. In industrial cleaning, e.g. in the food industry, the use of alkali, usually sodium hydroxide solution, is necessary in the cleaning solutions in many applications.

Owing not only to concentration and pH elevation via $CO_2$ discharge, but also to addition of sodium hydroxide solution, the concentration of hardness constituents, in particular calcium ions and carbonate ions, increases. If the natural waters were in equilibrium (lime-carbon dioxide equilibrium) prior to use, an increase in the concentration of the hardness constituents leads to oversaturation. To prevent effluent scale deposits (encrustations), e.g. on heat transfer surfaces or on the material to be cleaned, the addition of additives ("scale inhibitors") is necessary.

The situation is similar in the case of secondary extraction in the mineral oil sector:

The injection waters used must be treated in some circumstances by addition of additives in order to prevent precipitation of inorganic salts such as calcium carbonate, calcium sulfate, strontium sulfate and barium sulfate in the formation and a blockage of the oil flow resulting therefrom.

A further purpose, sometimes even the predominant one, of additive use in water treatment is the protection of metallic materials against corrosion. For example, when unalloyed carbon steels are used in open circulation cooling systems, adequate corrosion inhibition is desired since the conditions (oxygen saturation, salt accumulation) prevailing in such systems lead to an acceleration of corrosion.

The water treatment compositions used in accordance with the prior art and alkaline cleaners require further improvements:

Polyphosphates have only a restricted solubility so that the preparation of highly concentrated formulations is restricted and, moreover, they are hydrolytically unstable. Furthermore, their relatively high phosphorus content is being criticized.

Phosphonates of the type amino-tris-methylenephosphonic acid and 1-hydroxy-ethane-1,1-diphosphonic acid are technically advanced products as compared with polyphosphates. They show a good hydrolytic stability and good activity as scale inhibitors. As a result, these products can generally be used at lower concentrations. The phosphorus concentrations in the treated waters are correspondingly lower in comparison with polyphosphate use.

2-Phosphono-butane-1,2,4-tricarboxylic acid, in comparison to the other phosphonates, exhibits a still further improved scale-inhibiting activity with significantly increased stability with respect to hypochlorite and hypobromite or chlorine and bromine which are used as biocides and disinfectants. The phosphorus content of this product is considerably reduced in comparison with the other phosphonates.

Polycarboxylic acids such as polyacrylates or copolymers based on acrylic acid and other polycarboxylic acids having C-C chains are generally phosphorus-free products, but have the disadvantage of corrosion-inhibiting and scale-inhibiting activity inadequate for many applications.

Special sulfonic acid group-containing polymers have also already been described. Thus U.S. Pat. No. 3,928,196 discloses that copolymers of 2-acrylamido-2-methylpropyl-sulfonic acids and acrylic acid can be used to prevent the deposition of sparingly soluble inorganic compounds ("scale").

Furthermore, vinyl polymers are known (U.S. Pat. No. 5,049,310) which contain relatively small proportions of sulfonic acid groups and which are used in corrosion inhibitors containing zinc salt. They serve there predominantly to prevent the precipitation of sparingly soluble zinc compounds, e.g. zinc hydroxide, at elevated cooling water pH values.

All the organic compounds mentioned hitherto share only a low biodegradability. This is frequently a precondition for their use, e.g. the use of readily biodegradable additives in open circulation cooling systems, because of the conditions prevailing in such systems, would lead to the degradation of the additives while they are still in the system. In other applications, e.g. having very low residence times in the system, on the other hand, a ready biodegradability can be less of an interference.

A ready biodegradability is advantageous in any case when the additives pass after use—which occurs frequently—into the receiving water.

The development of readily or more readily biodegradable additives for water treatment and for use in alkaline cleaners is therefore an industrially and ecologically expedient aim.

A first step for this was taken by the development of the polycarboxylic acid, polyaspartic acid (PAA), see U.S. Pat. No. 4,534,881, 4,839,461, in particular column 2, lines 23 et seq., U.S. Pat. No. 5,116,513 and U.S. Pat. No. 5,152,902.

It is also desirable in the case of detergent additives that these are biodegradable. EP-A-256 366 (=U.S. Pat. No. 4,839,461, cf. column 2, lines 23 et seq.) has already disclosed using polyaspartic acid as a detergent additive.

EP 0 454 126 disclosed polyamino acids, in particular polyaspartic acid or poly-glutamic acid which can be used as builders and/or cobuilders in detergents and are said to be biodegradable.

Furthermore, modified polyaspartic acids are known which are suitable as additive to detergents and cleansing agents and for water treatment (DE-A-4 221 875).

Despite biodegradability, the action of the abovementioned compounds in detergents is frequently not yet completely satisfactory.

DE-A-2 253 190 discloses surfactants which were formed by reaction of poly-aspartimides with long-chain amines.

Moreover, certain polyaspartic acid derivatives have already been found which contain mercapto groups and sulfonic acid groups and are suitable for use in cosmetic preparations, particularly shampoos (U.S. Pat. No. 4,363,797).

SUMMARY OF THE INVENTION

The object underlying the invention is to discover improved biodegradable polymers which are suitable in particular for water treatment and as a detergent additive.

The invention relates to polymers having repeating aspartyl units of the structure

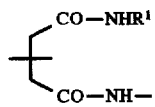   (I)

and if appropriate

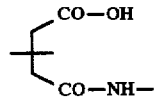   (II)

where

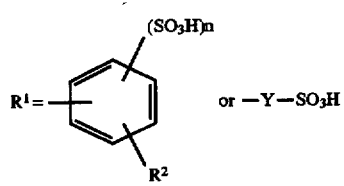   or —Y—SO$_3$H n=1 or 2

Y=straight-chain or branched alkyl, alkenyl or alkinyl,

R$^2$=H, alkyl, alkoxy or halogen or a salt thereof, for the case where R$^1$=—CH$_2$—CH$_2$—SO$_3$H or a salt thereof, the molar ratio of the structures II/I being greater than 1.

DESCRIPTION OF THE PREFERRED EMBODIMENTS

In a preferred embodiment, the sum of the units I and II is from 10 to 1000, in particular from 10 to 300. The repeating units are preferably randomly distributed and can be linked together via α- or β-bonds. The α- and β-units of the structures I and II are reproduced below; obviously they can also relate to the salts of these structures:

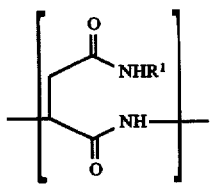

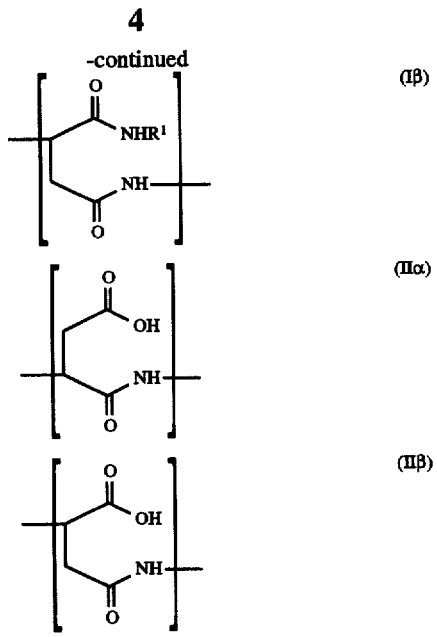

In a preferred embodiment, at least 50%, in particular at least 70%, of the repeating structures (I) and (II) occur via β-linkages.

The end groups of the compounds according to the invention can be varied in a wide range depending on the preparation; possible end groups are, for example

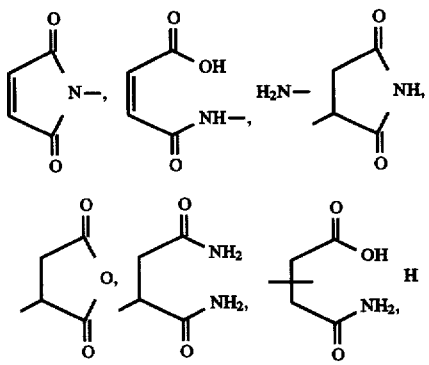

In addition, other repeating units can be contained.

Polyaspartic acid derivatives of the general formula (I) are particularly preferred in which R$^1$ represents —Y—SO$_3$H or the corresponding Na$^+$, K$^+$, NH$_4^+$ salts, R$^2$ represents H, alkyl having 1 to 6 carbon atoms which is unsubstituted or substituted by 1 to 5 halogen atoms, alkoxy which comprises 1 to 6 carbon atoms in the alkyl moiety and which is unsubstituted or substituted with 1 to 5 halogen atoms, or halogen, and Y represents straight-chain or branched alkyl having 1 to 10 C atoms, straight-chain or branched alkenyl or alkinyl having 2 to 10 carbon atoms, and n represents 1 or 2.

Further preferred repeating units which can be contained in the compounds according to the invention are, for example, a) malic acid units such as

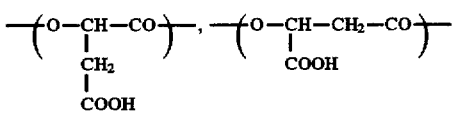

b) maleic acid units such as

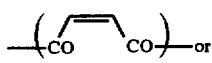

c) fumaric acid units such as

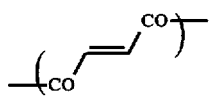

Polyaspartic acid derivatives are highly particularly preferred in which
R$^1$ represents

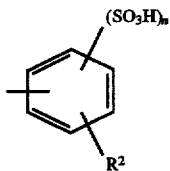

or —Y—SO$_3$H, or the corresponding Na$^+$, K$^+$ or NH$_4^+$ salts,

R$^2$ represents H, alkyl having 1 to 4 carbon atoms which is unsubstituted or substituted by 1 to 3 fluorine and/or chlorine atoms, alkoxy which comprises 1 to 4 carbon atoms in the alkyl moiety and which is unsubstituted or substituted by 1 to 3 fluorine and/or chlorine atoms, or fluorine or chlorine, and Y represents straight-chain or branched alkyl having 1 to 8 carbon atoms, straight-chain or branched alkenyl or alkinyl having 2 to 8 carbon atoms and n represents 1 or 2.

The polyaspartic acid derivatives of the general formula (I) according to the invention are obtained if polysuccinimide is first reacted with an amine of the formula H$_2$N—R$^1$, in particular

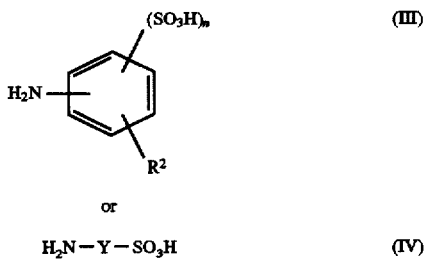

H$_2$N—Y—SO$_3$H (IV)

in which Y, n and R$^2$ have the meanings given above, in the presence or absence of bases and in the presence or absence of diluents to give polyaspartic acid derivatives having repeating units of the structure (I), if appropriate of the structure (II), and repeating polysuccinimide units and then opening the succinimide units which are still unopened by amines using bases, in the presence or absence of diluents.

The two part-steps can be carried out both with isolation of the abovedescribed intermediates and alternatively without isolation of the intermediates as an "one-pot reaction".

The reaction temperatures for the first part-step can be varied within a broad range. Generally, temperatures between 0° C. and 250° C. are employed, in particular temperatures between 10° C. and 120° C.

Diluents which may be used if required are all diluents which do not themselves react with polysuccinimide. Generally, hydrocarbons such as toluene, xylene or hexane; chlorinated hydrocarbons such as chlorobenzene or chloroform; ketones such as acetone; ethers such as tetrahydrofuran, diethyl ether, methyl tert-butyl ether or dioxane; nitriles such as acetonitrile; dimethylformamide, N-methylpyrrolidone, dimethyl sulfoxide, sulfolane or nitromethane are used. Highly particularly preferably, acetonitrile, acetone, dioxane, dimethylformamide, N-methyl-pyrrolidone, dimethyl sulfoxide, sulfolane or nitromethane are used. Bipolar aprotic solvents are particularly preferred of these.

The reactions can be carried out in the presence or absence of bases. In this case all conventional bases can be used. These preferably include tertiary amines such as triethylamine and pyridine, alkali metal hydroxides such as sodium hydroxide and potassium hydroxide and alkali metal carbonates and alkali metal hydrogen-carbonates such as potassium carbonate and sodium hydrogencarbonate.

The reaction temperatures for the second part-step can likewise be varied within a broad range. Generally, temperatures between 0° C. and 120° C. are employed, in particular temperatures between 10° C. and 80° C.

Diluents which may be used if required are diluents which have already been mentioned for the first part-step and also water, alcohols such as methanol, ethanol, isopropanol or butanol.

The bases used for opening the succinimide units either comprise alkali metal hydroxides such as sodium hydroxide, potassium hydroxide or lithium hydroxide, alkali metal carbonates or alkali metal hydrogencarbonates such as potassium carbonate, sodium carbonate, potassium hydrogencarbonate or sodium hydrogen-carbonate or aqueous ammonia.

An isolation which may take place if required can be performed in various ways both for the first and also the second part-step. In this case, either the diluent used is evaporated or the reaction product is precipitated by stirring it into solvents in which the product is either sparingly or not at all soluble and filtering by suction. In many cases the product can also be filtered off by suction directly from the reaction mixture.

The polysuccinimides used are known and can be prepared in various ways. The following may be mentioned here by way of example:

The thermal polycondensation of aspartic acid to give polysuccinimide which is described, for example, in J. Org. Chem. 26, 1084 (1961); DE-A 2 253 190 and EP 0 578 449. In addition, polysuccinimides having different molecular weight distributions can also be prepared by polycondensation of aspartic acid in the presence of acids and dehydrating compounds, for example phosphoric acid, as is disclosed by J. Med. Chem. 16, 893 (1973) and DE 4 023 463. It is likewise possible to prepare polysuccinimide in a two-stage process from maleic acid or derivatives thereof such as maleic anhydride and ammonia via the intermediates monoammonium maleate, maleamic acid. Moreover, the monoammonium salt of malic acid can also be thermally converted into polysuccinimide. These abovementioned preparation processes are disclosed, for example, by J. Org. Chem. 24, 1662 (1959), DE-A 2 253 190 and DE 3 626 672. A further method of preparation of polysuccinimide is the base-catalyzed anionic polymerization of maleimide as described, e.g., in Japanese Patent Specification 44-439.4 (1969).

Further polymers with repeating aspartic acid groups of the formulae

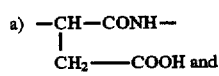
a) —CH—CONH—
   |
   CH₂——COOH and

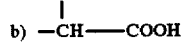
   CH₂—CONH—
   |
b) —CH——COOH or salts thereof, can be prepared by hydrolysis of the polysuccinimide structures. Methods for hydrolysis have been disclosed in the prior art cited above. Generally, more than 50%, preferably more than 70% of the recurring aspartic acid units are the β-linked structures b).

The invention further relates to the use of polymers having repeating aspartyl units of the structures I and II

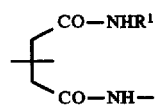
$$\left\{\begin{array}{c}CO-NHR^1 \\ \\ CO-NH-\end{array}\right.$$  (I)

and if appropriate

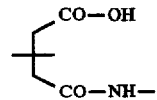
$$\left\{\begin{array}{c}CO-OH \\ \\ CO-NH-\end{array}\right.$$  (II)

where

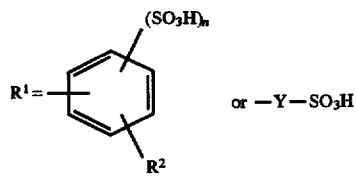

$$R^1 = \underset{R^2}{\underset{|}{\bigcirc}}(SO_3H)_n \quad \text{or} \quad -Y-SO_3H$$

n=1 or 2

Y=straight-chain or branched alkyl, alkenyl or alkinyl,

R²=H, alkyl, alkoxy or halogen in washing processes and water treatment processes and corresponding detergents and water treatment compositions. In this case the preferred meanings for the sub-stituents, molecular weights, α/β ratios etc. are just as in the case of the novel polymers according to the invention.

The invention further relates to synergistically active mixtures of polyaspartic acid and aminosulfonic acids of the structure III or IV, in which Y, n and R² have the meanings given above.

Synergistically means, that the use of the combination of polyaspartic acid provides better results than the use of polyaspartic acid or the aminosulfonic acid alone.

The dispersion power of the combination is superior to the dispersion power of the polyaspartic acid and the aminosulfonic acid by themselves.

Particularly preferred are synergistically active mixtures of polyaspartic acid including their Na⁺, K⁺ or NH₄⁺ salts and aminosulfonic acids of the structure III or IV, wherein Y, n and R² have the meanings given above or their corresponding Na⁺, K⁺ or NH₄⁺—salts with ratios (by weight) varying from 1:100 to 100:1 (polyaspartic acid: aminosulfonic acid).

Highly particularly preferred are synergistically active mixtures of polyaspartic acid including their Na⁺, K⁺ or NH₄⁺—salts and aminosulfonic acids of the structure III or IV, wherein Y, n and R² have the meanings given above or their corresponding Na⁺, K⁺ or NH₄⁺—salts with ratios (by weight) varying from 1:25 to 25:1 (polyaspartic acid: aminosulfonic acid).

The mixtures are prepared by mixing the compounds, in substance or as solutions.

The aminosulfonic acids are known and commercially available.

The polyaspartic acids are known and available by different methods described in the literature.

The polyaspartic acid derivatives or synergistically active mixtures of polyaspartic acid and aminosulfonic acids can be used as an additive to low-phosphate or phosphate-free detergents and cleaning agents. The amount of polyaspartic acid derivatives or synergistically active mixtures of polyaspartic acid and amino sulfonic acids used is 0.1 to 30% by weight, based on the detergent and cleaning compositions. Low-phosphate detergents is taken to mean those formulations which contain no more than 25% by weight of phosphate, calculated as sodium triphosphate. Phosphate-free detergents generally contain sodium aluminum silicate. The polyaspartic acid derivatives of the general formula (I) or synergistically active mixtures of polyaspartic acid and aminosulfonic acids are preferably used in amounts of 0.5 to 15% by weight, based on the detergent and cleaning composition formulation. The abovedescribed polyaspartic acid derivatives or synergistically active mixtures of polyaspartic acid and amino-syulfonic acids have a good dispersion capacity for particulate soil in the detergent bath. The polyaspartic acid derivatives or synergistically active mixtures of polyaspartic acid and aminosulfonic acids are builders and/or cobuilders for detergents and, during the washing process, effect a reduction in encrustation and greyness on the washed textile material. They are thus also suitable as encrustation inhibitors and antiredeposition agents.

Moreover, it is also possible that, if required, alkali metal silicates are further contained. Alkali metal silicates which can be used are, for example, amorphous sodium disilicates, crystalline sheet silicates, sodium silicates which are formed by dehydration of sodium silicate solution, and sodium aluminum silicate (zeolite A). They can be additionally contained up to 50% by weight.

The detergents can if required further contain a bleaching agent, e.g. sodium perborate which, when used, can be contained in the detergent formulation in amounts up to 30% by weight. If required, still further additives can be contained, for example complexing agents, citrates, opacifiers, optical brighteners, enzymes, perfuming oils, antiredeposition agents, bleach activators and/or color transfer inhibitors.

The polyaspartic acid derivatives or synergistically active mixtures of polyaspartic acid and aminosulfonic acids are stable to storage both in liquid and in solid detergent formulations having the abovementioned components which may or may not be contained.

When the polyaspartic acid derivatives or synergistically active mixtures of polyaspartic acid and aminosulfonic acids are used for water treatment, the compounds can be used as scale inhibitors and also as corrosion inhibitors. Areas of use of such compositions can be, e.g.: water treatment (e.g. treatment of cooling waters, process waters, gas scrubbing waters, injection waters in secondary oil extraction and water treatment in mining) and industrial and institutional cleaner applications (e.g. vessel and equipment cleaning in the food industry, bottle washing, for institutional dishwashers and detergents).

Because of the action profile for water treatment, the polyaspartic acid derivatives or synergistically active mixtures of polyaspartic acid and aminosulfonic acids are suitable not only for industrial applications in water treatment, but also for preventing the precipitation or removing, mineral deposits of tooth plaques. The polyaspartic acid derivatives or synergistically active mixtures of polyaspartic acid and aminosulfonic acids can be used alone or in a mixture in diverse tooth cleaning or tooth treatment agents. Those which may be mentioned here by way of example are mouthwashes, abrasive and nonabrasive toothpastes, dentifrices, dental flosses, chewing gums, denture (false teeth) cleaning agents.

The polyaspartic acid derivatives or synergistically active mixtures of polyaspartic acid and aminosulfonic acids can also be used in combination with one or more substances which have proved to be useful for the particular application. Examples of such components by admixture of which synergistic effects are also frequently to be achieved are: phosphonic acids, e.g. phosphonocarboxylic acids, in particular phosphonosuccinic acid, phosphonopropionic acid and especially 2-phosphono-butane-1,2,4-tricarboxylic acid (Bayhibit® AM). Other suitable phosphonic acids are, for example, those which have an amino or hydroxyl function, in particular nitrilo-tris-methylenephosphonic acid and the higher analogs such as ethylenediaminetetrakis (methylenephosphonic acid) and diethylenetriaminepentakis (methylenephosphonic acid) and their N-oxides; 1-hydroxyethane-1,1-di-phosphonic acid and hydroxyphosphonoacetic acid. Other suitable and synergistically active admixing partners are the aminosulfonic acids of the formulae III and IV and salts thereof.

Further potential components in formulations containing the products according to the invention of the general formula (I) or synergistically active mixtures of polyaspartic acid and aminosulfonic acids are: zinc salts, molybdates, borates, silicates, azoles (e.g. tolyl- or benzotriazole), other phosphonic acids, polymers and copolymers based on acrylic acid, on methacrylic acid and on maleic acid, lignosulfonates, tannins, phosphates, complexing agents, citric acid, tartaric acid, gluconic acid, surfactants, biocides, disinfectants.

It is obvious to those skilled in the art that instead of acids (e.g. "phosphonic acids") salts thereof ("phosphonates") can also be used and vice versa.

The present invention further relates to a process for water treatment which comprises introducing the composition according to the invention into the water to be treated.

The present invention further relates to a process for alkaline cleaning which comprises using the composition according to the invention as encrustation inhibitor/sequestrant.

The process for water treatment is to be described below with reference to examples: the compositions according to the invention are added to the influent water at concentrations between about 0.1 and 10 mg/l of active compound, e.g., to prevent sediments and deposits when used in cooling systems with fresh water cooling.

In cooling circuits, the additives, for scale prevention and/or corrosion protection, are frequently dosed in a rate-dependent manner based on the feed water. The concentrations are between about 1 and 50 mg/l of active compound in the circulating cooling water.

In seawater desalination by distillation in MSF (multistage flash) and VP (vapor compression) plants, encrustations on the heat exchange surfaces are prevented by additive additions of about 1 to 5 mg/l of active compounds or synergistically active mixtures of polyaspartic acid and aminosulfonic acids to the feed seawater.

The doses required in RO (reverse osmosis) plants, because of the lower maximum temperatures due to the process, are generally considerably lower.

The method of using the compositions according to the invention in alkaline cleaning is described as follows:

The active compound or synergistically active mixtures of polyaspartic acid and aminosulfonic acids concentrations used for encrustation inhibition and sequestering in alkaline cleaning depend, in particular, on the technological and physical conditions, such as pH, residence time, temperature, water hardness.

Whereas in the relatively weak alkaline range (pH up to about 10) at temperatures below 60° C. and with relatively short residence times active compound or synergistically active mixtures of polyaspartic acid and aminosulfonic acids concentrations of markedly below 100 mg/l, generally 5 to 80 mg/l, are frequently sufficient, at higher alkali concentrations and temperatures, doses of over 100 mg/l to 300 mg/l are sometimes required.

Preparation Examples

Preparation of the intermediates (reaction of amine with polysuccinimide)

EXAMPLE III-1

10 g of polysuccinimide are dissolved in DMF and at room temperature a solution of 5.72 g of aminomethylsulfonic acid dissolved in a little DMF is added. The mixture is stirred for 24 h at room temperature and the product is precipitated by stirring into butanol. After filtering by suction, the residue is washed with acetone and ether and then dried for 24 h at 50° C. in a vacuum drying cabinet. Yield: 15.3 g of a beige solid.

The amines mentioned in Table 1 were reacted similarly.

TABLE 1

| Ex. No. | Amine used | Amount of amine | Amount of polysuccinimide | Ratio of repeating units I/polysuccinimide |
|---|---|---|---|---|
| III-2 | $H_2N-CH_2-SO_3H$ | 1.1 g | 10 g | 10/95 |
| III-3 | $H_2N-CH_2-SO_3H$ | 0.57 g | 10 g | 5/95 |
| III-4 | $H_2N-CH_2CH_2-SO_3H$ | 6.45 g | 10 g | 50/50 |
| III-5 | $H_2N-CH_2CH_2-SO_3H$ | 1.29 g | 10 g | 10/90 |
| III-6 | $H_2N-CH_2CH_2-SO_3H$ | 0.65 g | 10 g | 5/95 |
| III-7 |  | 17.84 g | 10 g | 100/0 |

TABLE 1-continued

| Ex. No. | Amine used | Amount of amine | Amount of polysuccinimide | Ratio of repeating units I/polysuccinimide |
|---|---|---|---|---|
| III-8 | H₂N—C₆H₄—SO₃H | 9 g | 10 g | 50/50 |
| III-9 | H₂N—C₆H₄—SO₃H | 1.78 g | 10 g | 10/90 |
| III-10 | H₂N—C₆H₄—SO₃H | 0.90 g | 10 g | 5/95 |

Preparation of the polyaspartic acid derivatives of the formula (I)

EXAMPLE I-1

10.7 g of the reaction product prepared in Example III-1 are introduced and stirred with 70 ml of 1 N NaOH for 3 h at 50° C. After cooling, the mixture is stirred into isopropanol, decanted off from the solvent, stirred 2 x with acetone and the solid is filtered off by suction. It is dried for 24 h at 50° C. in the vacuum-drying cabinet. Yield: 12 g of a beige solid Analysis: C: 27.7%, H: 3.87%, N: 9.91%, S: 7.5%

The products mentioned in Table 1 were also reacted similarly (see Table 2).

TABLE 2

| Ex. No. | Starting material | Elemental analysis |
|---|---|---|
| I-2 | III-2 | C: 30.4%, H: 3.78%, N: 8.21%, S: 1.8% |
| I-3 | III-3 | C: 30.5%, H: 3.84%, N: 8.11% |
| I-4 | III-4 | C: 28.9%, H: 4.47%, N: 9.73%, S: 7.1% |
| I-5 | III-5 | S: 0.8% |
| I-6 | III-6 | C: 28.8%, H: 3.64%, N: 7.90%, S: 0.5% |
| I-7 | III-7 | C: 44.1%, H: 3.8%, N: 10.2%, S: 12.4% |
| I-8 | III-8 | C: 37.8%, H: 3.78%, N: 9.39%, S: 7.2% |
| I-9 | III-9 | C: 31.6%, H: 4.07%, N: 8.5%, S: 0.2% |
| I-10 | III-10 | C: 30.9%, H: 4.06%, N: 8.2%, S: 0.12% |

Application Examples

The compounds according to the invention, the Application Examples and the mixture were tested in accordance with Tenside, Surfactans und Detergents, 24, 213–216 (1987). (CCDP II) and H. Haschke, G. Morlock, P. Kuzel, Chemikerzeitung 96, 199 (1972) or Paolo Zini, Polymeric additives for high performing detergents, ISBN-No. 1-56676-143-3, pages 51–64 (CCDP I). As a deposition example of the prior art, polyaspartic acid, sodium salt was used. The higher the value (in mg/g) for calcium carbonate dispersion power, the better the dispersion power is.

TABLE 3

| Compound (Table 2) | CCDP I in mg/g | CCDP II in mg/g | Initial sample weight |
|---|---|---|---|
| I-2 | 142.6 | 58.2 | 0.5 g |
| I-3 | 142.6 | 63.8 | 0.5 g |
| I-4 | 120.1 | 54.4 | 0.5 g |
| I-5 | 124.8 | 40.5 | 1.0 g |
| I-6 | 121.9 | 56.3 | 0.5 g |
| I-8 | 142.6 | 58.2 | 0.5 g |
| I-10 | 146.4 | 63.8 | 0.5 g |
| Polyaspartic acid, sodium salt | 112.3 | 35.1 | 1.0 g |

CCDP = calcium carbonate dispersion power

Synergistic properties

The combination of polymers with repeating aspartyl units, especially of polyaspartic acid, with aminosulfonic acids demonstrates synergistic properties as set forth in table 4.

TABLE 4

CCDP-values; synergistic combinations of polyaspartic acid and aminosulfonic acids

| | CCDP II | Initial sample weight |
|---|---|---|
| Polyaspartic acid, sodium salt | 35.1 | 1.0 g |
| Taurine, sodium salt | 20.1 | 1.0 g |
| Mixture of taurine and polyaspartic acid[1] | 37.6 | 1.0 g |

[1] both as sodium salt, ratio 10:90; the components are present as mixture, not in a reacted state!

Table 4 demonstrates that the mixture of taurine and a polyaspartic acid provides for better results than the compounds themselves, i.e. the mixture has a higher (=better) CCDP value.

What is claimed is:

1. A composition which is useful for water treatment or as a detergent additive and contains a polymer containing repeating aspartyl units of the structure

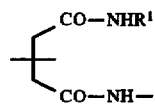

(I)

where

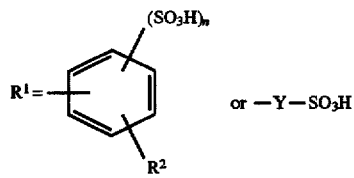

n=1 or 2

Y represents a straight-chain or branched alkyl group having 1 to 10 carbon atoms, or a straight-chain or branched alkenyl or alkinyl group having 2 to 10 carbon atoms, $R^2$ represents H, an alkyl group having 1 to 6 carbon atoms which is unsubstituted or substituted by 1 to 5 halogen atoms, an alkoxy group which comprises 1 to 6 carbon atoms in the alkyl moiety and which is unsubstituted or substituted with 1 to 5 halogen atoms, or a halogen, or a salt thereof.

2. A composition according to claim 1, wherein the polymer comprises additionally repeating units of the formula II

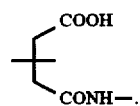

3. A detergent containing 0.1 to 3.0% by weight of a polymer having repeating units of the formulae

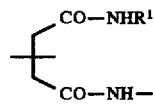 (I)

where

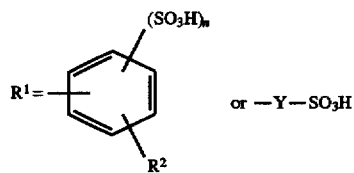

n=1 or 2

Y represents a straight-chain or branched alkyl group having 1 to 10 carbon atoms, or a straight-chain or branched alkenyl or alkinyl group having 2 to 10 carbon atoms, $R^2$ represents H, an alkyl group having 1 to 6 carbon atoms which is unsubstituted or substituted by 1 to 5 halogen atoms, an alkoxy group which comprises 1 to 6 carbon atoms in the alkyl moiety and which is unsubstituted or substituted with 1 to 5 halogen atoms, or a halogen, or a salt thereof.

4. A composition according to claim 3 wherein the polymer comprises additionally repeating units of the formula II

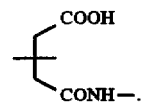

5. A water-treatment composition containing 0.5 to 15% by weight of a polymer having repeating units of the formula

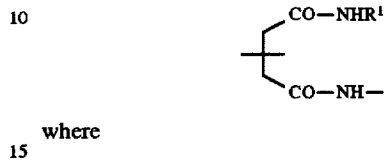 (I)

where

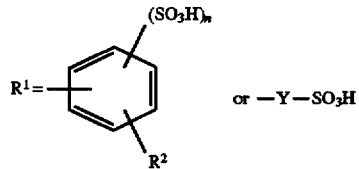

n=1 or 2

Y represents a straight-chain or branched alkyl group having 1 to 10 carbon atoms, or a straight-chain or branched alkenyl or alkinyl group having 2 to 10 carbon atoms, $R^2$ represents H, an alkyl group having 1 to 6 carbon atoms which is unsubstituted or substituted by 1 to 5 halogen atoms, an alkoxy group which comprises 1 to 6 carbon atoms in the alkyl moiety and which is unsubstituted or substituted with 1 to 5 halogen atoms, or a halogen, or a salt thereof.

6. A composition according to claim 5, wherein the polymer comprises additionally repeating units of the formula II

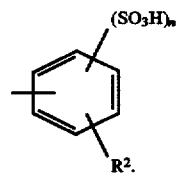

7. A method for preparing a detergent where a compound having repeating units of the formula

where

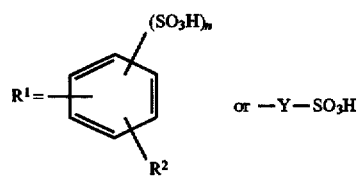

n=1 or 2

Y represents a straight-chain or branched alkyl group having 1 to 10 carbon atoms, or a straight-chain or branched alkenyl or alkinyl group having 2 to 10 carbon atoms, R² represents H, an alkyl group having 1 to 6 carbon atoms which is unsubstituted or substituted by 1 to 5 halogen atoms, an alkoxy group which comprises 1 to 6 carbon atoms in the alkyl moiety and which is unsubstituted or substituted with 1 to 5 halogen atoms, or a halogen, or a salt thereof is used as a detergent additive.

8. A method according to claim 7, wherein the polymer comprises additionally repeating units of the formula II

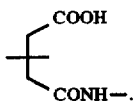

9. A method for preparing a water treatment composition wherein a polymer having repeating units of the formula

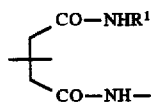

where

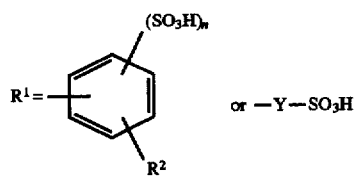

n=1 or 2

Y represents a straight-chain or branched alkyl group having 1 to 10 carbon atoms, or a straight-chain or branched alkenyl or alkinyl group having 2 to 10 carbon atoms, R² represents H, an alkyl group having 1 to 6 carbon atoms which is unsubstituted or substituted by 1 to 5 halogen atoms, an alkoxy group which comprises 1 to 6 carbon atoms in the alkyl moiety and which is unsubstituted or substituted with 1 to 5 halogen atoms, or a halogen, or a salt thereof.

10. A method according to claim 9 wherein the polymer comprises additionally repeating units of the formula II

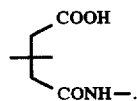

11. A synergistically active mixture of polyaspartic acid and/or salts thereof with aminosulfonic acids of the formula III or IV

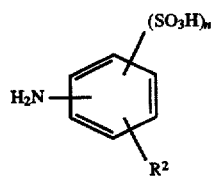

$$H_2N-Y-SO_3H \qquad (IV)$$

or a salt thereof, wherein n=1 or 2

Y represents a straight-chain or branched alkyl group having 1 to 10 carbon atoms, or a straight-chain or branched alkenyl or alkinyl group having 2 to 10 carbon atoms, and R² represents H, an alkyl group having 1 to 6 carbon atoms which is unsubstituted or substituted by 1 to 5 halogen atoms, an alkoxy group which comprises 1 to 6 carbon atoms in the alkyl moiety and which is unsubstituted or substituted with 1 to 5 halogen atoms, or a halogen.

12. A synergistically active mixture of a salt of polyaspartic acid and a salt of an aminosulfonic acid of the formula III or IV

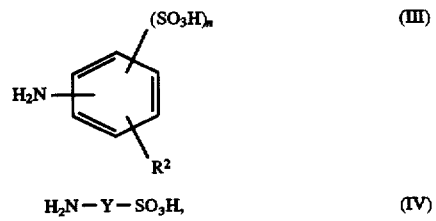

$$H_2N-Y-SO_3H, \qquad (IV)$$

wherein n=1 or 2

Y represents a straight-chain or branched alkyl group having 1 to 10 carbon atoms, or a straight-chain or branched alkenyl or alkinyl group having 2 to 10 carbon atoms, and R² represents H, an alkyl group having 1 to 6 carbon atoms which is unsubstituted or substituted by 1 to 5 halogen atoms, an alkoxy group which comprises 1 to 6 carbon atoms in the alkyl moiety and which is unsubstituted or substituted with 1 to 5 halogen atoms, or a halogen.

13. A synergistically active mixture according to claim 12, wherein said salt of polyaspartic acid is a sodium, potassium or ammonium salt of said polyaspartic acid and said salt of an aminosulfonic acid of the formula III or IV is a sodium, potassium or ammonium salt of said aminosulfonic acid.

14. A synergistically active mixture according to claim 13, wherein said salt of polyaspartic acid is a sodium salt of said polyaspartic acid and said salt of an aminosulfonic acid of the formula III or IV is a sodium salt of said aminosulfonic acid.

15. A synergistically active mixture according to claim 14, wherein said sodium salt of said aminosulfonic acid is a sodium salt of taurine.

* * * * *

UNITED STATES PATENT AND TRADEMARK OFFICE
CERTIFICATE OF CORRECTION

PATENT NO. : 5,726,280
DATED : March 10, 1998
INVENTOR(S) : UHR, et. al.

It is certified that error appears in the above-identified patent and that said Letters Patent is hereby corrected as shown below:

Title page, item [54], and col. 1, line 3, "PREPARTION" should read -- PREPARATION--

Title page, item [57], Abstract, before the last line, the following should be inserted:
-- or a salt thereof,
n = 1 or 2
Y = straight-chain or branched alkyl, alkenyl or alkinyl,
$R^2$ = H, alkyl, alkoxy or halogen,--

Signed and Sealed this

Twenty-sixth Day of December, 2000

Attest:

Q. TODD DICKINSON

*Attesting Officer*           *Director of Patents and Trademarks*